United States Patent
Mizoguchi

(10) Patent No.: US 10,181,995 B2
(45) Date of Patent: Jan. 15, 2019

(54) MONITORING CONTROL SYSTEM, MONITORING CONTROL DEVICE, AND CONTROLLER

(71) Applicant: Kabushiki Kaisha Toshiba, Minato-ku, Tokyo (JP)

(72) Inventor: Yoshitomo Mizoguchi, Sagamihara Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 265 days.

(21) Appl. No.: 15/114,700

(22) PCT Filed: Mar. 30, 2015

(86) PCT No.: PCT/JP2015/059913
§ 371 (c)(1),
(2) Date: Jul. 27, 2016

(87) PCT Pub. No.: WO2015/163092
PCT Pub. Date: Oct. 29, 2015

(65) Prior Publication Data
US 2017/0034033 A1    Feb. 2, 2017

(30) Foreign Application Priority Data

Apr. 21, 2014 (JP) .................. 2014-087619

(51) Int. Cl.
*G06F 15/173* (2006.01)
*H04L 12/26* (2006.01)
(Continued)

(52) U.S. Cl.
CPC ............ *H04L 43/12* (2013.01); *G05B 19/048* (2013.01); *G05B 19/05* (2013.01); *G05B 23/0208* (2013.01); *G05B 2219/24015* (2013.01)

(58) Field of Classification Search
CPC ... H04L 43/12; G05B 19/048; G05B 23/0208; G05B 19/05; G05B 2219/24015
See application file for complete search history.

(56) References Cited

U.S. PATENT DOCUMENTS 4,998,246 A * 3/1991 Tanaka .................. H04L 12/433
370/452
5,068,849 A * 11/1991 Tanaka .................. H04L 12/433
370/452
(Continued)

FOREIGN PATENT DOCUMENTS

CN        1591299 A      3/2005
CN      101042587 A      9/2007
(Continued)

OTHER PUBLICATIONS

International Search Report mailed by Japan Patent Office dated Jun. 23, 2015 in the corresponding PCT Application No. PCT/JP2015/059913—7 pages.

(Continued)

*Primary Examiner* — Padma Mundur
(74) *Attorney, Agent, or Firm* — Knobbe, Martens, Olson & Bear, LLP

(57) ABSTRACT

According to one embodiment, a monitoring control system includes a controller and a monitoring control device. The monitoring control device includes: a first common memory to store therein common data cyclically transmitted/received by cyclic transmission; a first internal memory to store therein data other than the common data; and a search processor that searches control data to control the controller by transmitting tag information associated with the control data to the controller. The controller includes: a second common memory to store therein the common data; a second internal memory to store therein data other than the common data; and a storage processor that stores the control (Continued)

data read from the second internal memory in the second common memory as the common data when the control data corresponding to the tag information received from the monitoring control device is not stored in the second common memory.

10 Claims, 11 Drawing Sheets

(51) Int. Cl.
*G05B 19/05* (2006.01)
*G05B 23/02* (2006.01)
*G05B 19/048* (2006.01)

(56) References Cited

U.S. PATENT DOCUMENTS

| | | | |
|---|---|---|---|
| 7,032,080 B2 * | 4/2006 | Mugitani | H04J 3/0652 370/438 |
| 7,643,888 B2 * | 1/2010 | Ashida | G05B 19/0421 700/1 |
| 2005/0050232 A1 | 3/2005 | Yoshioka | |

FOREIGN PATENT DOCUMENTS

| | | |
|---|---|---|
| JP | H05-304695 A | 11/1993 |
| JP | H10-229412 A | 8/1998 |
| JP | 2002-118572 A | 4/2002 |
| JP | 2002-232969 A | 8/2002 |
| JP | 2004-199528 A | 7/2004 |
| JP | 2006-099431 A | 4/2006 |
| JP | 2007-228059 A | 9/2007 |

OTHER PUBLICATIONS

Written Opinion mailed by Japan Patent Office dated Jun. 23, 2015 in the corresponding PCT Application No. PCT/JP2015/059913 (Japanese language only)—4 pages.

The First Office Action mailed by the State Intellectual Property Office of People's Republic of China dated May 4, 2017 in the corresponding Chinese patent application No. 201580001275.X.

* cited by examiner

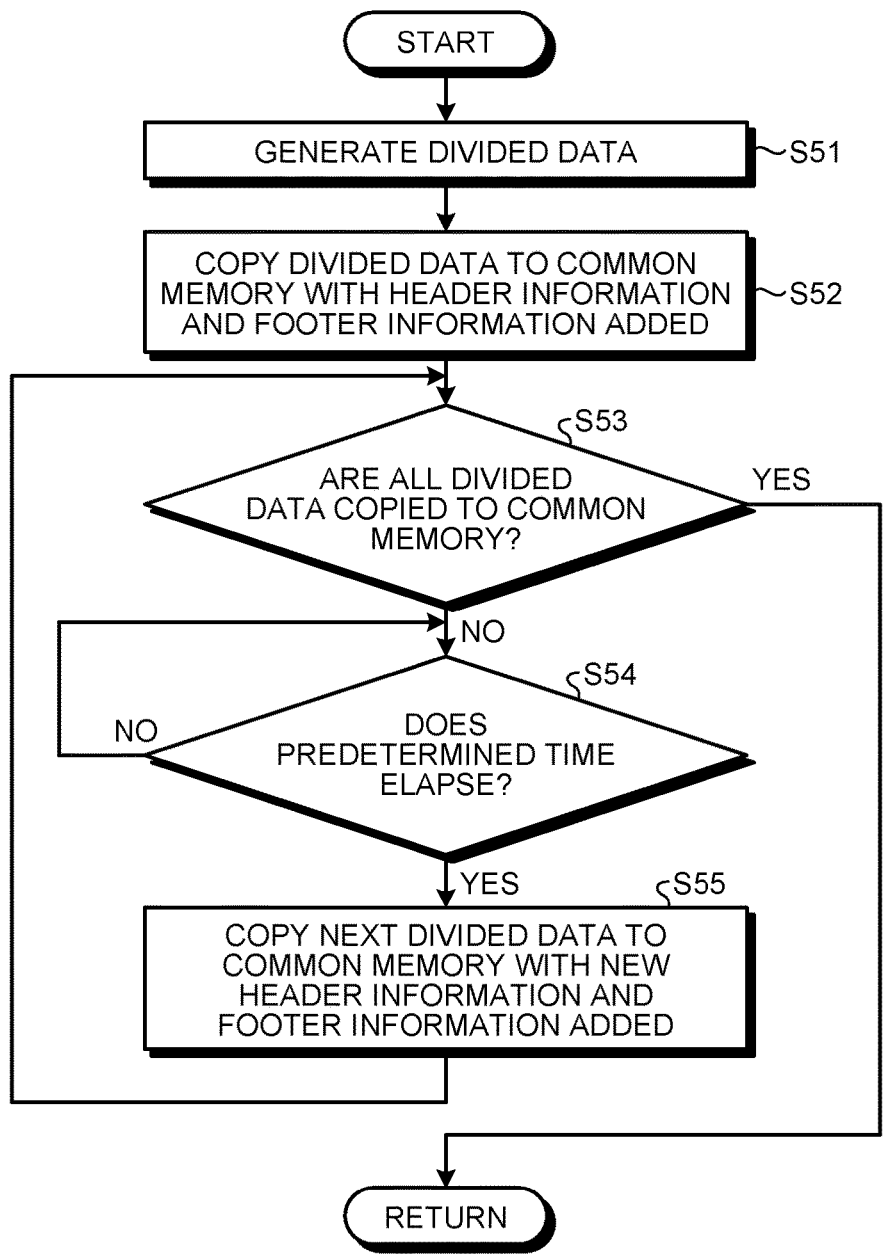

MONITORING CONTROL SYSTEM, MONITORING CONTROL DEVICE, AND CONTROLLER

CROSS-REFERENCE TO RELATED APPLICATIONS

This application is national stage application of International Application No. PCT/JP2015/059913, filed Mar. 30, 2015, which designates the United States, incorporated herein by reference, and which is based upon and claims the benefit of priority from Japanese Patent Application No. 2014-087619, filed Apr. 21, 2014, the entire contents of which are incorporated herein by reference.

FIELD

Embodiments described herein relate generally to a monitoring control system, a monitoring control device, and a controller.

BACKGROUND

Conventionally, there has been known a monitoring control system provided with a controller which controls equipment such as a plant, and a monitoring control device which monitors and controls the controller through a network. In such monitoring control system, each device on the network is sometimes configured to cyclically perform cyclic transmission. The cyclic transmission is a data transmitting system for making contents of common memories provided on the devices on the network the same. In the cyclic transmission, each device on the network is configured to cyclically update the content of its own common memory by cyclically transmitting/receiving common data stored in its own common memory to/from other devices.

In the conventional monitoring control system described above, when desired control data is not stored in the common memory, the desired control data is generally acquired by one-to-one data communication performed separately from data communication by the cyclic transmission. Therefore, a processing load when acquiring the control data which is not stored in the common memory often becomes large.

BRIEF DESCRIPTION OF DRAWINGS

FIG. 12 is a flowchart illustrating one example of a specific content of a process executed when the controller according to the second embodiment copies the divided data in the internal memory to the common memory.

DETAILED DESCRIPTION

In general, according to one embodiment, a monitoring control system according to an embodiment comprises a controller and a monitoring control device. The controller is configured to control external equipment. The monitoring control device is configured to monitor and control the controller through a network. Each of the controller and the monitoring control device is configured to cyclically perform cyclic transmission in the network. The monitoring control device comprises a first common memory, a first internal memory, and a search processor. The first common memory is configured to store therein common data cyclically transmitted/received by the cyclic transmission. The first internal memory is configured to store therein data other than the common data. The search processor is configured to search control data to control the controller by transmitting tag information associated with the control data to the controller. The controller comprises a second common memory, a second internal memory, and a storage processor. The second common memory is configured to store therein the common data. The second internal memory is configured to store therein data other than the common data. The storage processor is configured to store the control data read from the second internal memory in the second common memory as the common data when the control data corresponding to the tag information received from the monitoring control device is not stored in the second common memory.

Embodiments are hereinafter described with reference to the drawings.

First Embodiment

Firstly, one example of a network configuration and a functional configuration of a monitoring control system 1000 according to a first embodiment is described with reference to FIG. 1.

Figure 1:
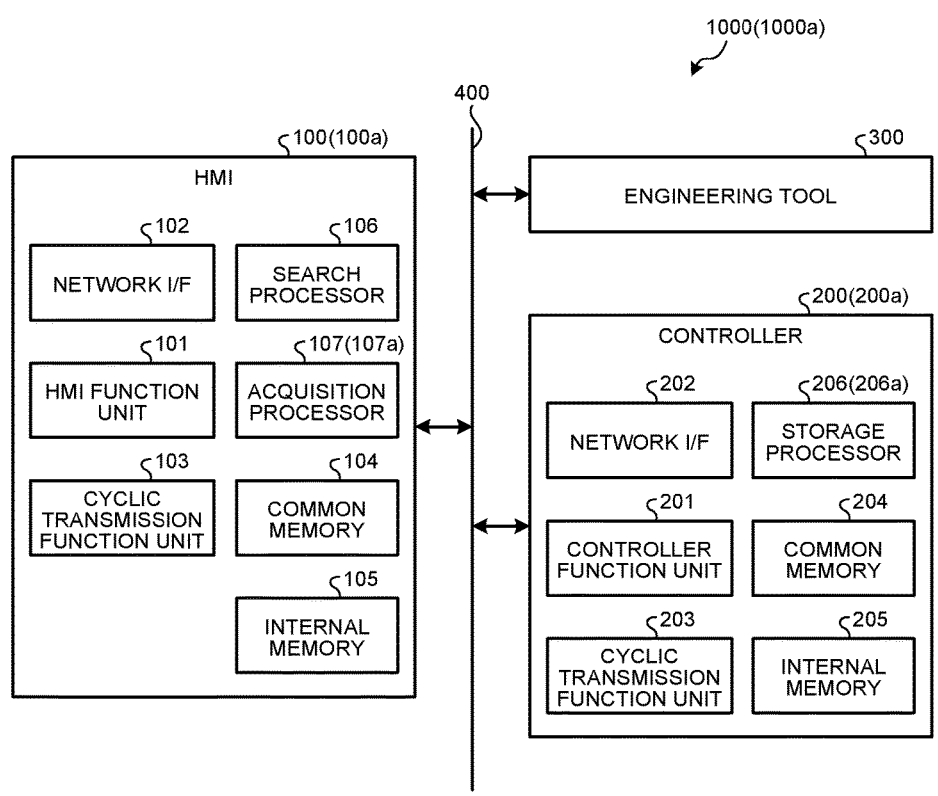
FIG. 1 is a block diagram illustrating one example of a network configuration and a functional configuration of a monitoring control system according to a first embodiment.

As illustrated in FIG. 1, the monitoring control system 1000 comprises a HMI (human machine interface) 100, a controller 200, and an engineering tool 300. The HMI 100, the controller 200, and the engineering tool 300 are connected to one another through a network 400. Although one example in which one HMI 100 and one controller 200 are provided is illustrated in FIG. 1, the number of the HMIs 100 and controllers 200 may be two or larger. Meanwhile, the HMI 100 is one example of a "monitoring control device".

The controller 200 is a computer such as a PLC (programmable logic controller) which controls various types of external equipment (plant equipment) including water and sewage treatment equipment, incineration equipment, seawater desalting equipment, water treatment equipment, and the like. The HMI 100 is a computer which monitors and controls the controller 200 through the network 400.

The HMI 100 comprises a HMI function unit 101, a network I/F 102, a cyclic transmission function unit 103, a common memory 104, an internal memory 105, a search processor 106, and an acquisition processor 107. The controller 200 comprises a controller function unit 201, a network I/F 202, a cyclic transmission function unit 203, a common memory 204, an internal memory 205, and a storage processor 206.

The HMI function unit 101 is configured with a software application and the like for processing various control data used for controlling the controller 200. The controller function unit 201 is configured with a software application and the like for controlling the external equipment (various types of plant equipment described above) connected to the controller 200.

The network I/F 102 is an interface for connecting the HMI 100 to the network 400 and is configured with, for example, an Ethernet™ adopter and the like. Similarly, the network I/F 202 is an interface for connecting the controller 200 to the network, and is configured with, for example, an Ethernet™ adopter and the like.

Herein, in the first embodiment, the HMI 100 and the controller 200 are configured to cyclically perform cyclic transmission (scan transmission) in the network 400. According to this, the HMI 100 and the controller 200 may refer to the control data of the same content as described hereinafter.

The cyclic transmission is a data transmission system in which a plurality of devices (stations) on a TCnet-compliant network performs data transmission to one another at a constant cycle such that each of the devices has the data of the same content (common data). A communication protocol used in the cyclic transmission includes the TCnet, for example. The TCnet is a real-time communication protocol and is a network technology to realize communication function described above on the Ethernet™.

Figure 2:
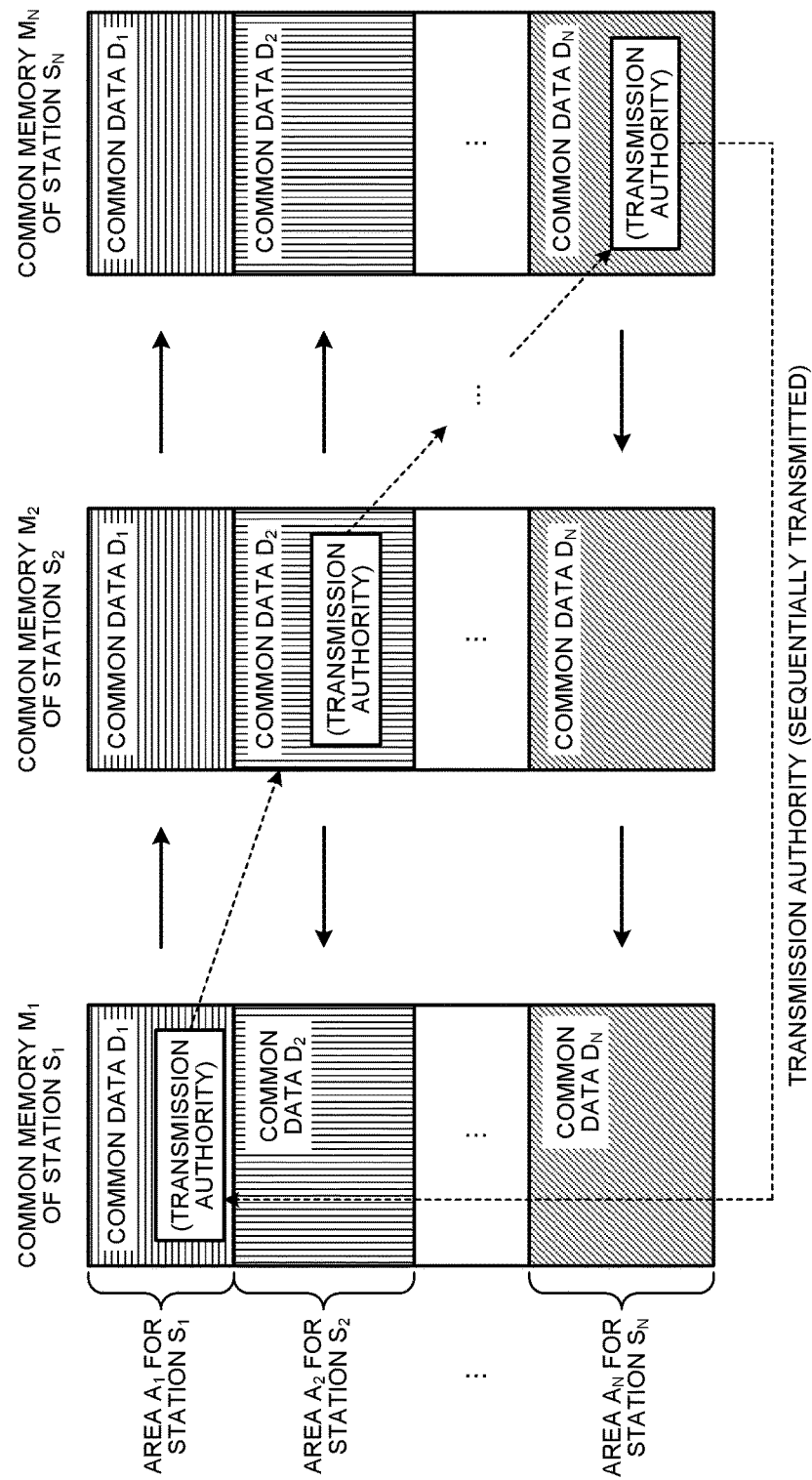
FIG. 2 is an exemplary diagram illustrating a concept of cyclic transmission performed in the monitoring control system according to the first embodiment.

As illustrated in FIG. 2, in the cyclic transmission, all stations $S_1$ to $S_N$ on the network comprise common memories $M_1$ to $M_N$ of the same capacity, respectively, and common data (scan data) $D_1$ to $D_N$ stored in each of the common memories $M_1$ to $M_N$ are transmitted/received at a constant cycle by simultaneous communication by multicasting or broadcasting.

More specifically, in the cyclic transmission, a token accompanied with a data transmission authority is sequentially transmitted among a plurality of stations $S_1$ to $S_N$. Each of the stations $S_1$ to $S_N$ which receives the token becomes a talker to transmit each of the common data $D_1$ to $D_N$ in each of the common memories $M_1$ to $M_N$ of the stations $S_1$ to $S_N$ to other stations $S_1$ to $S_N$ at a constant cycle. The stations $S_1$ to $S_N$ which receive the common data $D_1$ to $D_N$ to become listeners update the common data $D_1$ to $D_N$ corresponding to relevant stations (talkers) $S_1$ to $S_N$ stored in the common memories $M_1$ to $M_N$.

Meanwhile, the common data are stored in predetermined areas $A_1$ to $A_N$ in each of the common memories $M_1$ to $M_N$. Assignment of the common data $D_1$ to $D_N$ of each of the stations $S_1$ to $S_N$ to the areas $A_1$ to $A_N$ in each of the common memories $M_1$ to $M_N$ may be arbitrary set by the device on the network (for example, the engineering tool 300 on the network 400 in the example illustrated in FIG. 1).

Each of the cyclic transmission function units 103 and 203 (refer to FIG. 1) is configured with a software application and the like to implement the above-described cyclic transmission. The common memories 104 and 204 are provided to store therein the common data cyclically transmitted/received by the above-described cyclic transmission. The internal memories 105 and 205 are provided to store therein data other than the common data.

Figure 3:
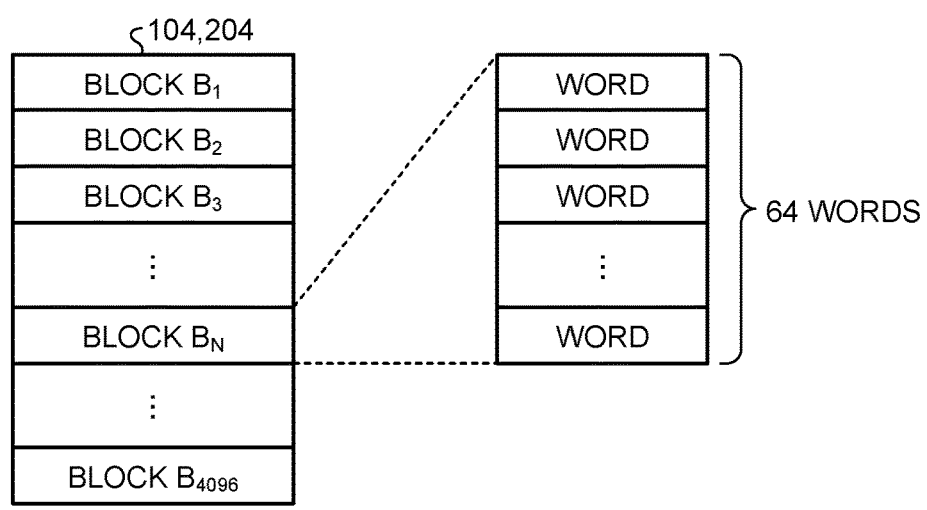
FIG. 3 is a diagram illustrating one example of a configuration of a common memory according to the first embodiment.

As illustrated in FIG. 3, each of the common memories 104 and 204 is configured with a plurality of blocks set to have the same size. FIG. 3 illustrates one example in which each of the common memories 104 and 204 is formed of 4096 blocks $B_1$ to $B_{4096}$ and the size of each of the blocks $B_1$ to $B_{4096}$ is set to include 64 words.

The search processor 106 (refer to FIG. 1) is configured to search the control data to control the controller 200 by transmitting tag information (identification information) associated with the control data to the controller 200. The search processor 106 is configured to simultaneously transmit the tag information to all the controllers 200 when there are a plurality of controllers 200 on the network 400.

The storage processor 206 is configured to determine whether the control data corresponding to the tag information is stored in the common memory 204 of its own device (HMI 100) when receiving tag information from the HMI 100. The storage processor 206 is configured to transmit (return) address information indicating the area (blocks $B_1$ to $B_{4096}$: refer to FIG. 3) in the common memory 204 in which the control data is stored to the HMI 100 when the control data corresponding to the tag information received from the HMI 100 is stored in the common memory 204. According to this, the acquisition processor 107 may acquire desired control data with reference to the common memory 104 of its own device (HMI 100) based on the address information received from the controller 200.

Herein, the number of the blocks $B_1$ to $B_{4096}$ (refer to FIG. 3) of the common memory 204 is limited as described above, so that it is not possible for the common memory 204 to store therein all the control data included in the controller 200. Therefore, only the control data a value of which frequently changes is stored in the common memory 204 as the common data, and it is difficult to always store the control data the value of which merely changes other than this in the common memory 204. The control data the value of which merely changes includes a range, upper/lower limit values, an industrial unit, a line parameter and the like, for example, and a data amount thereof is often large. Therefore, the storage processor 206 cannot always return a place where the control data is stored (address information) to the HMI 100, even if receiving the tag information from the HMI 100, when the size of the control data corresponding to the tag information is larger than the size of the area assigned for its own device (controller 200) in the common memory 204.

Therefore, the storage processor 206 is configured to notify, when the control data corresponding to the tag information received from the HMI 100 is not stored in the common memory 204, the HMI 100 that the control data is not stored in the common memory 204. The storage processor 206 is configured to read the control data corresponding to the tag information received from the HMI 100 from the internal memory 205 and store the read control data in the common memory 204 as the common data. Hereinafter, suppose that the size of the control data is larger than the size of the area assigned for the controller 200 in the common memory 204 when the control data corresponding to the tag information received from the HMI 100 is not stored in the common memory 204.

Figure 4:
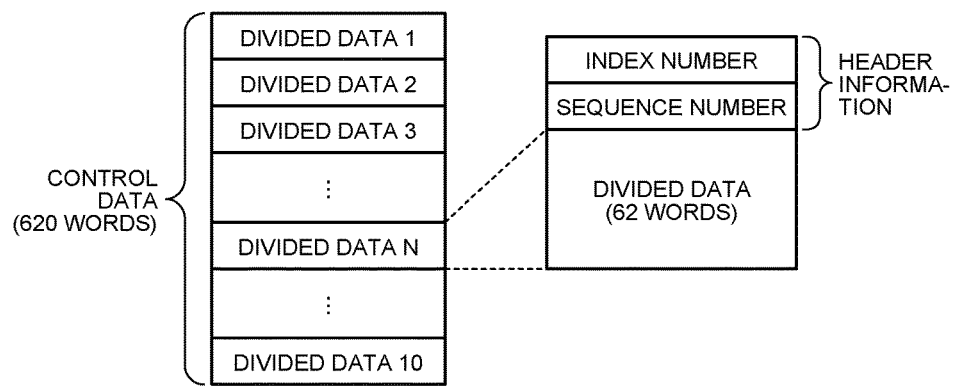
FIG. 4 is a diagram to explain one example of a method for transmitting/receiving control data (divided data) stored in an internal memory of a controller according to the first embodiment by the cyclic transmission.

Specifically, as illustrated in FIG. 4, the storage processor 206 is configured to divide the control data according to the size of the area assigned for the controller 200 in the common memory 204, thereby generating a plurality of divided data when the control data corresponding to the tag information received from the HMI 100 is not stored in the common memory 204. In the first embodiment, the size of each divided data may be any size as long as this is not larger than the size of the area assigned for the controller 200. The storage processor 206 is configured to add different pieces of header information to a header of each divided data generated in the above-described manner and sequentially store (copy) each divided data to which the header information is added in the area assigned for the controller 200 in the common memory 204 one by one at a predetermined time interval. Meanwhile, FIG. 4 illustrates one example of dividing the control data including 620 words into data including 62 words, thereby generating ten divided data 1 to 10.

Herein, the header information includes an index number and a sequence number to be described next.

The index number is information indicating a part of entire control data to which each divided data corresponds. For example, in the example illustrated in FIG. 4, the index number may take ten values of 1 to 10.

The sequence number is information indicating a position in order of a certain divided data copied to the common memory 204 out of all the divided data, and is the value updated each time each divided data is copied to the common memory 204. For example, in the example illustrated in FIG. 4, when divided data N is the N-th data copied to the common memory 204, the sequence number added to the divided data N is "N".

Herein, the time interval when each of a plurality of divided data described above is sequentially copied to the common memory 204 is set to be not shorter than three times the cycle of the transmission/reception of the common data by the cyclic transmission. According to this, each divided data copied to the common memory 204 is transmitted/received as the common data at least twice or more by the cyclic transmission.

The acquisition processor 107 (refer to FIG. 1) is configured to wait until the divided data stored in the common memory 204 of the controller 200 in the above-described manner is stored in the common memory 104 of the HMI 100 as the common data by the cyclic transmission when receiving notification that the control data corresponding to the tag information transmitted by the search processor 106 is not stored in the common memory 204 from the controller 200. The acquisition processor 107 is configured: to monitor the header information of each divided data stored in the common memory 104 as the common data; to acquire the divided data from the common memory 104 each time the sequence number is updated; and to sequentially store (copy) the divided data in the internal memory 105 according to the index number. According to this, one control data configured with a plurality of divided data is generated on the internal memory 105.

Figure 5:
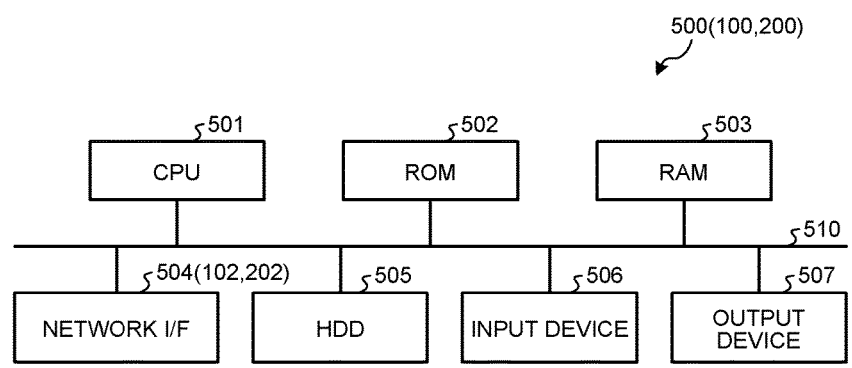
FIG. 5 is a block diagram illustrating one example of a hardware configuration of a computer used as a HMI and the controller according to the first embodiment.

Meanwhile, in the first embodiment, a hardware configuration is not a dedicated hardware configuration for performing the cyclic transmission but a general hardware configuration obtained by using a general computer 500 as illustrated in FIG. 5. That is to say, each of the HMI 100 and the controller 200 comprises, as the hardware configuration, a CPU (central processing unit) 501, a ROM (read only memory) 502, a RAM (random access memory) 503, a network I/F 504, a HDD (hard disk drive) 505, an input device 506 such as a keyboard and a mouse, and an output device 507 such as a display device. These hardware components are connected to a bus 510.

Next, one example of control operation when the HMI 100 according to the first embodiment acquires the control data is described with reference to FIG. 6.

Figure 6:
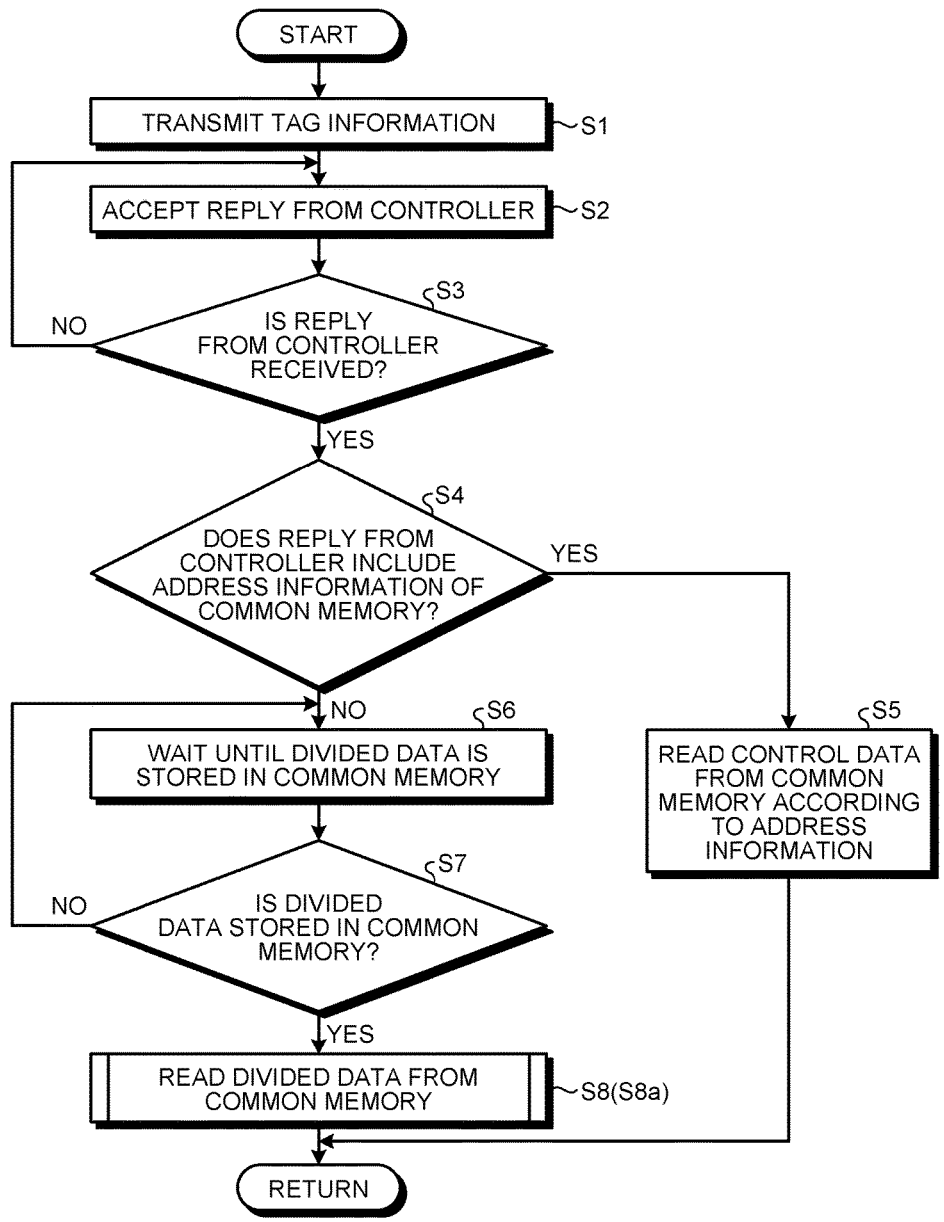
FIG. 6 is a flowchart illustrating one example of control operation when the HMI according to the first embodiment acquires the control data.

As illustrated in FIG. 6, the HMI 100 (search processor 106) first transmits the tag information to the controller 200 at step S1. Then, the procedure shifts to step S2. Herein, the tag information is the identification information associated with the control data for the HMI 100 to monitor and control the controller 200.

At step S2, the HMI 100 accepts a reply from the controller 200. Then, the procedure shifts to step S3.

At step S3, the HMI 100 determines whether the reply from the controller 200 is received. When it is determined that the reply from the controller 200 is not received at step S3, the procedure returns to step S2. When it is determined that the reply from the controller 200 is received at step S3, the procedure shifts to step S4.

At step S4, the HMI 100 (acquisition processor 107) determines whether the reply from the controller 200 includes the address information indicating the place where the control data corresponding to the tag information is stored.

When it is determined that the reply from the controller 200 includes the address information at step S4, the procedure shifts to step S5. At step S5, the HMI 100 reads the control data from the common memory 104 according to the address information included in the reply from the controller 200. Then, the procedure ends.

On the other hand, when it is determined that the reply from the controller 200 does not include the address information at step S4, the procedure shifts to step S6. At step S6, the HMI 100 waits until the divided data based on the control data corresponding to the tag information (refer to step S31 in FIG. 9 to be described later) is stored in its own common memory 104. Specifically, the HMI 100 waits until the divided data is transmitted from the controller 200 to the HMI 100 by the cyclic transmission. Then, the procedure shifts to step S7.

At step S7, the HMI 100 determines whether the divided data is stored in the common memory 104. When it is determined that the divided data is not yet stored in the common memory 104 at step S7, the procedure returns to step S6. When it is determined that the divided data is stored in the common memory 104 at step S7, the procedure shifts to step S8.

At step S8, the HMI 100 reads the divided data from the common memory 104 and copies the read divided data to the internal memory 105. A specific content of the process at step S8 is described later with reference to FIG. 8. Then, the procedure ends.

Next, one example of control operation when the controller 200 according to the first embodiment receives the tag information from the HMI 100 is described with reference to FIG. 7.

Figure 7:
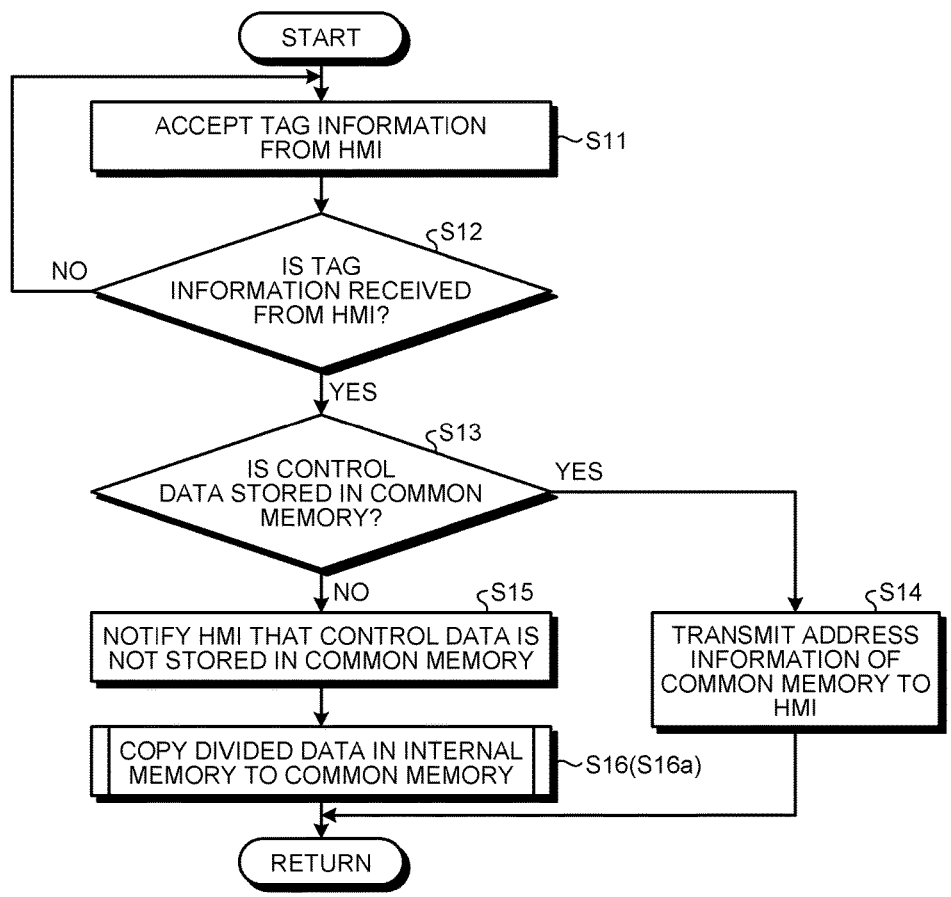
FIG. 7 is a flowchart illustrating one example of control operation when the controller according to the first embodiment receives tag information from the HMI.

As illustrated in FIG. 7, the controller 200 (storage processor 206) first accepts the tag information (refer to step S1 in FIG. 6 described above) from the HMI 100 at step S11. Then, the procedure shifts to step S12.

At step S12, the controller 200 determines whether the tag information from the HMI 100 is received. When it is determined that the tag information from the HMI 100 is not yet received at step S12, the procedure returns to step S11. When it is determined that the tag information from the HMI 100 is received at step S12, the procedure shifts to step S13.

At step S13, the controller 200 determines whether the control data corresponding to the tag information received from the HMI 100 is stored in its own common memory 204.

When it is determined that the control data corresponding to the tag information is stored in the common memory 204 at step S13, the procedure shifts to step S14. At step S14, the controller 200 transmits the address information indicating the area in the common memory 204 in which the control data corresponding to the tag information is stored to the HMI 100. Then, the procedure ends.

On the other hand, when it is determined that the control data corresponding to the tag information is not stored in the common memory 204 at step S13, the procedure shifts to step S15. At step S15, the controller 200 notifies the HMI 100 that the control data is not stored in the common memory 204. Then, the procedure shifts to step S16.

At step S16, the controller 200 reads the divided data based on the control data corresponding to the tag information (refer to step S31 in FIG. 9 to be described later) from the internal memory 205 and copies the read divided data to the common memory 204. A specific content of the process at step S16 is described later with reference to FIG. 9. Then, the procedure ends.

Next, one example of the specific content of the process (process at step S8 in FIG. 6) executed when the HMI 100 according to the first embodiment reads the divided data from the common memory 104 is described with reference to FIG. 8.

Figure 8:
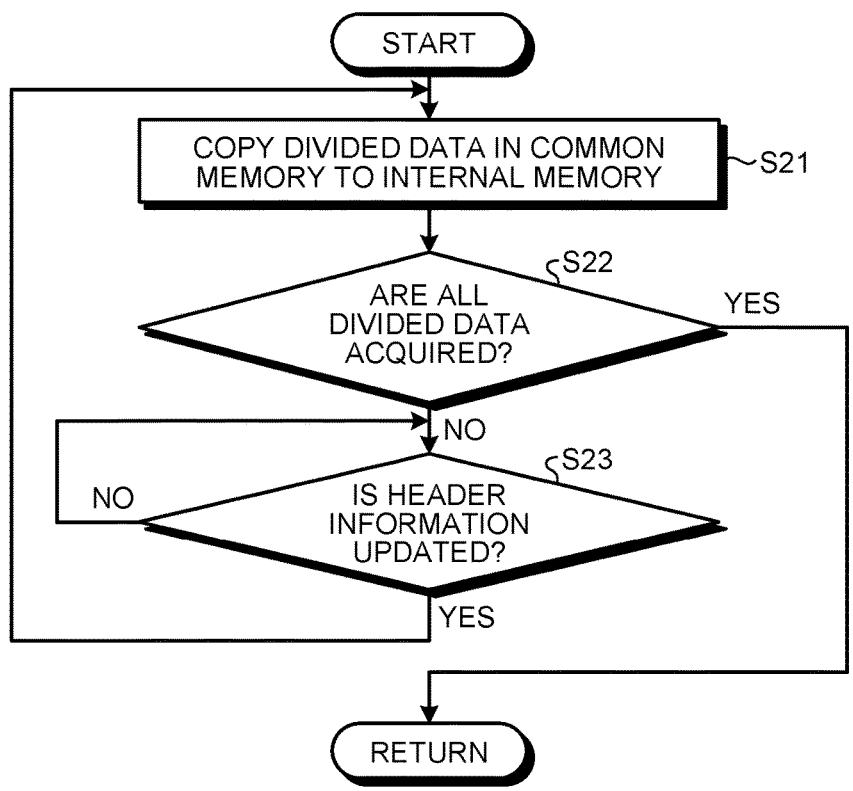
FIG. 8 is a flowchart illustrating one example of a specific content of a process executed when the HMI according to the first embodiment reads the divided data from the common memory.

As illustrated in FIG. 8, the HMI 100 (acquisition processor 107) first reads the divided data based on the control data corresponding to the tag information (refer to step S31 in FIG. 9 to be described later) from the common memory 104 and copies the read divided data to the internal memory 105 at step S21. At this time, the HMI 100 determines a place in the internal memory 105 where the read divided data is copied based on the index number of the header information added to the divided data. Then, the procedure shifts to step S22.

At step S22, the HMI 100 determines whether all the divided data forming the control data corresponding to the tag information are acquired. That is to say, the HMI 100 determines whether the control data is configured with a plurality of divided data copied to the internal memory 105 in order of index number by repetition of step S21 (to be described later).

When it is determined that all the divided data are acquired at step S22, the procedure ends. On the other hand, when it is determined that not all the divided data are acquired, that is to say, there still remains the divided data which is not acquired at step S22, the procedure shifts to step S23.

At step S23, the HMI 100 determines whether the header information added to the divided data stored in the common memory 104 is updated. Specifically, the HMI 100 determines whether the sequence number of the header information added to the divided data is updated.

The process at step S23 is repeated until it is determined that the header information is updated. When it is determined that the header information is updated at step S23, the procedure returns to step S21.

Next, one example of the specific content of the process (process at step S16 in FIG. 7) executed when the controller 200 according to the first embodiment copies the divided data in the internal memory 205 to the common memory 204 is described with reference to FIG. 9.

Figure 9:
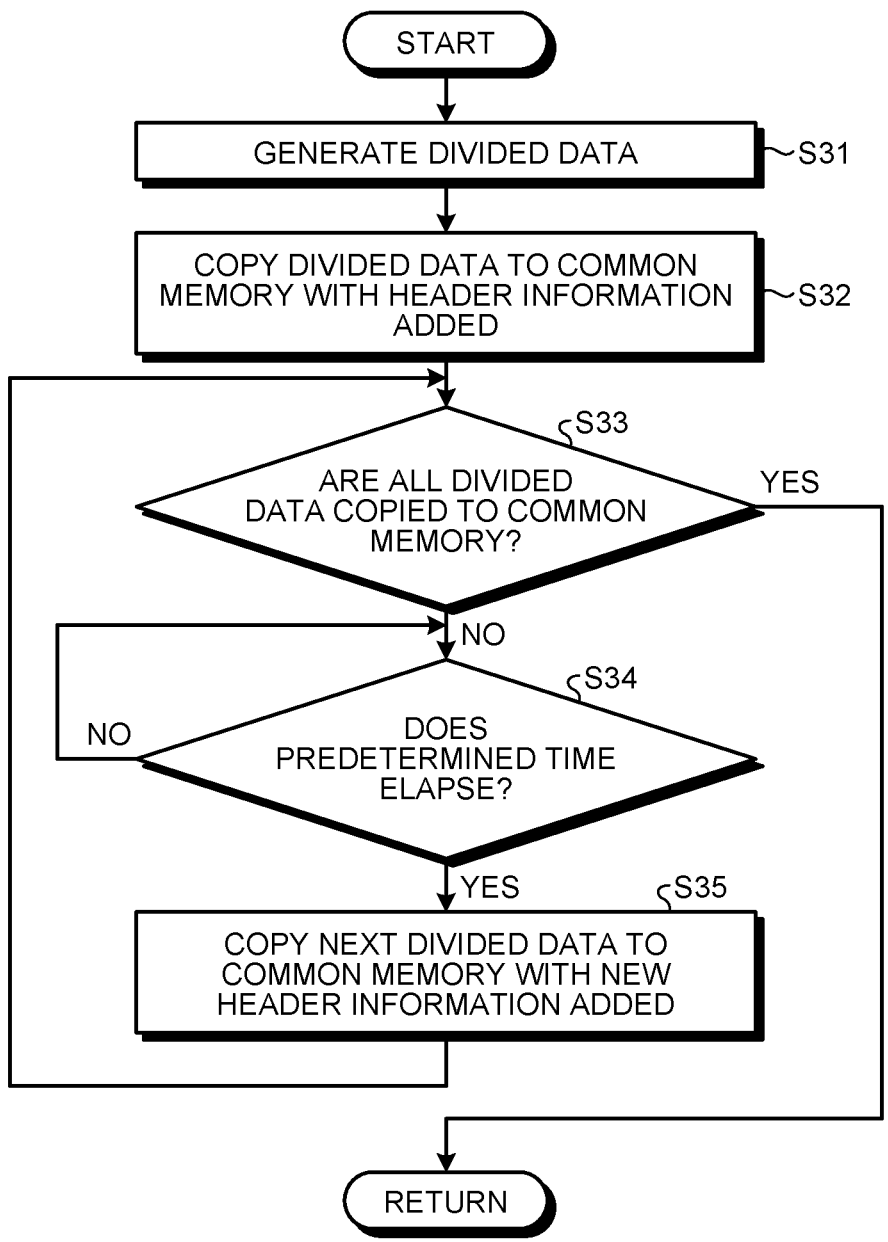
FIG. 9 is a flowchart illustrating one example of a specific content of a process executed when the controller according to the first embodiment copies the divided data in the internal memory to the common memory.

As illustrated in FIG. 9, the controller 200 (storage processor 206) first divides the control data stored in the internal memory 205 according to the size of a predetermined area (block assigned for the controller 200) in the common memory 204, thereby generating the divided data at step S31. Then, the procedure shifts to step S32.

At step S32, the controller 200 copies the divided data generated at step S31 to a predetermined area in the common memory 204 with the head information added. Meanwhile, initial values of the index number and the sequence number included in the header information are one. Then, the procedure shifts to step S33.

At step S33, the controller 200 determines whether all the divided data forming the control data corresponding to the tag information are copied to the common memory 204. That is to say, the controller 200 determines whether all of a plurality of divided data forming the control data are copied to the common memory 204 one by one in order of the index number by repeating a process at step S35 (to be described later).

At step S33, when it is determined that all the divided data are copied to the common memory 204, the procedure ends. On the other hand, when it is determined that not all the divided data are copied to the common memory 204, that is to say, there still remains the divided data which is not copied to the common memory 204 at step S33, the procedure shifts to step S34.

At step S34, the controller 200 determines whether a predetermined time elapses after the divided data is previously copied to the common memory 204. Meanwhile, a predetermined time is set to be not shorter than three times the cycle of the transmission/reception of the common data (data in the common memory 204) by the cyclic transmission.

The process at step S34 is repeated until it is determined that a predetermined time elapses from when the divided data is previously copied to the common memory 204. When it is determined that a predetermined time elapses after the divided data is previously copied to the common memory 204 at step S34, the procedure shifts to step S35.

At step S35, the controller 200 copies the divided data following the divided data previously copied to the common memory 204 to the common memory 204 with new header information added. Specifically, the controller 200 copies the divided data with the index number larger than the previous index number by one to the common memory 204 with the header information in which the index number and the sequence number are larger than the previous numbers by one added. Then, the procedure returns to step S33.

As described above, in the first embodiment, the storage processor 206 of the controller 200 is configured to read the control data from the internal memory 205 and to store the read control data in the common memory 204 as the common data when the control data corresponding to the tag information received from the HMI 100 is not stored in the common memory 204. According to this, it is possible to acquire desired control data by the cyclic transmission even when the desired control data (control data corresponding to the tag information) is not stored in the common memory 204. That is to say, it is not necessary to perform one-to-one data communication separately from the data communication by the cyclic transmission when acquiring the control data which is not stored in the common memory 204, so that a processing load may be reduced.

In the first embodiment, as described above, the storage processor 206 is configured to divide the control data into a plurality of divided data when the size of the control data corresponding to the tag information received from the HMI 100 is larger than the size of the area assigned for the controller 200 in the common memory 204. Meanwhile, the size of each divided data is not larger than the size of the area assigned for the controller 200 in the common memory 204. The storage processor 206 is configured to add the different pieces of header information to the header of each divided data generated in the above-described manner, and to sequentially store each divided data to which the header information is added in the area assigned for the controller 200 in the common memory 204 one by one at a predetermined time interval. According to this, it is possible to easily transmit/receive the desired control data by transmitting/receiving a plurality of divided data generated based on the control data one by one through the common memory 204 by the cyclic transmission even when the size of the control data is larger than the size of the area assigned for the controller 200. Moreover, it is possible to easily identify each divided data based on the header information by adding the different pieces of header information to each divided data.

In the first embodiment, as described above, the header information includes the index number indicating a part of one control data to which each of a plurality of divided data to which the header information is added corresponds. According to this, it is possible to easily determine the part of one control data to which each divided data corresponds by confirming the index number.

In the first embodiment, the header information includes the sequence number sequentially updated each time each of a plurality of divided data stored in the internal memory 205 is copied to the common memory 204 one by one as described above. According to this, the HMI 100 may easily confirm whether one divided data stored in the common memory 104 is updated by the cyclic transmission by monitoring the sequence number.

In the first embodiment, as described above, the acquisition processor 107 of the HMI 100 is configured to acquire each divided data from the common memory 104 each time the sequence number of each divided data stored in the common memory 104 as the common data is updated, and to sequentially copy acquired each divided data to the internal memory 105 according to the index number. According to this, the HMI 100 may easily acquire the desired control data based on a plurality of divided data acquired from the common memory 104.

In the first embodiment, the time interval when each of a plurality of divided data is sequentially copied to the common memory 204 is set to be not shorter than three times the cycle of the transmission/reception of the common data by the cyclic transmission as described above. According to this, the divided data of the same content is transmitted/received at least twice or more by the cyclic transmission, so that it is possible to more certainly transmit/receive the divided data.

Second Embodiment

Next, a monitoring control system according to a second embodiment is described with reference to FIGS. 1, 6, 7, and 10 to 12. Different from the above-described first embodiment, in the second embodiment, not only header information but also footer information is added to divided data transmitted/received by cyclic transmission.

A configuration of a monitoring control system 1000a according to the second embodiment is first described with reference to FIGS. 1 and 10.

As illustrated in FIG. 1, the monitoring control system 1000a comprises a HMI 100a, a controller 200a, and an engineering tool 300. The HMI 100a, the controller 200a, and the engineering tool 300 are connected to one another through a network 400. Meanwhile, the HMI 100a is an example of a "monitoring control device".

Herein, in the second embodiment, a storage processor 206a of the controller 200a is configured to add the footer information (refer to FIG. 10) corresponding to the header information to a footer of each divided data in addition to adding the header information to a header of each divided data when sequentially copying each of a plurality of divided data (refer to FIG. 10) to a common memory 204. Meanwhile, FIG. 10 illustrates one example of dividing control data including 600 words into data including 60 words, thereby generating ten divided data 1 to 10.

Figure 10:
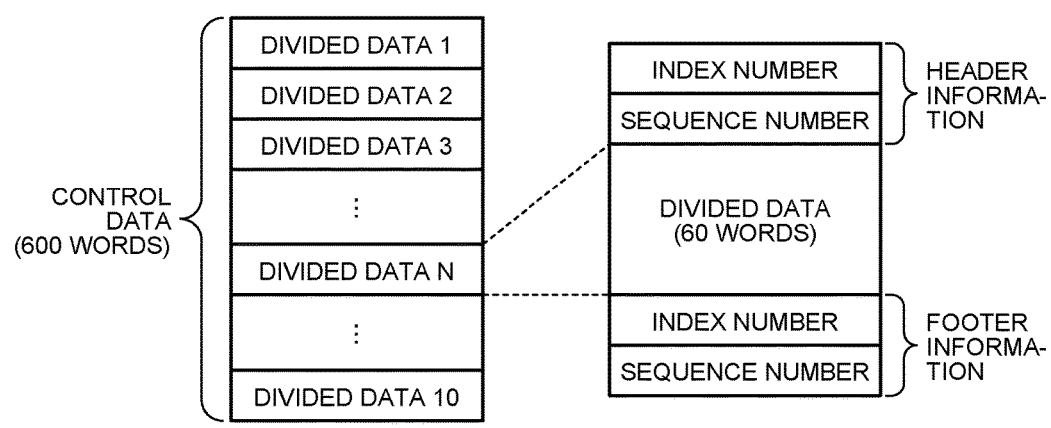
FIG. 10 is a diagram illustrating one example of a method of transmitting/receiving control data (divided data) stored in an internal memory of a controller according to a second embodiment by cyclic transmission.

As illustrated in FIG. 10, the footer information includes a data structure similar to that of the header information. That is to say, the footer information includes an index number indicating a part of entire control data to which each divided data corresponds and a sequence number indicating a position in order of certain divided data copied to the common memory 204 out of all the divided data.

An acquisition processor 107a (refer to FIG. 1) of the HMI 100a is configured to monitor both the header information and footer information of the divided data stored in a common memory 104 as common data, to acquire the divided data from the common memory 104 each time the sequence numbers of both the header information and footer information change, and to sequentially copy the acquired divided data to an internal memory 105.

Meanwhile, other configurations of the second embodiment are similar to those of the first embodiment, so that the description thereof is not herein repeated.

Next, control operation of the HMI 100a and the controller 200a according to the second embodiment is described with reference to FIGS. 6, 7, 11, and 12.

As illustrated in FIG. 6, the control operation when the HMI 100a according to the second embodiment acquires the control data is similar to that of the first embodiment except a process (process at step S8a) executed when the HMI 100a reads the divided data from the common memory 104. As illustrated in FIG. 7, the control operation when the controller 200a according to the second embodiment receives tag information from the HMI 100a is also similar to that of the first embodiment except a specific content of a process (process at step S16a) executed when the controller 200a copies the divided data in an internal memory 205 to the common memory 204. A part of the control operation according to the second embodiment different from that of the first embodiment is hereinafter described with reference to FIGS. 11 and 12.

First, one example of a specific content of the process (process at step S8a in FIG. 6) executed when the HMI 100a according to the second embodiment reads the divided data from the common memory 104 is described with reference to FIG. 11.

Figure 11:
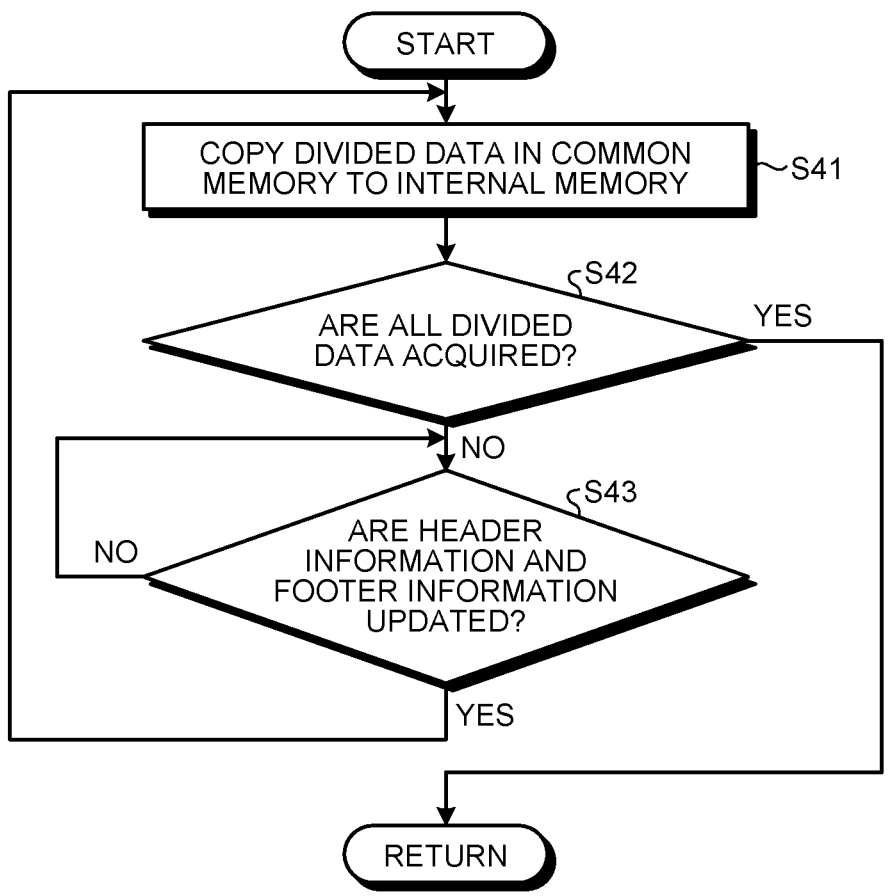
FIG. 11 is a flowchart illustrating one example of a specific content of a process executed when a HMI according to the second embodiment reads the divided data from a common memory.

As illustrated in FIG. 11, the HMI 100a (acquisition processor 107a) first reads the divided data based on the control data corresponding to the tag information (refer to step S51 in FIG. 12 to be described later) from the common memory 104 and copies the read divided data to the internal memory 105 at step S41. At this time, the HMI 100a determines a place in the internal memory 105 where the read divided data is copied based on the index number of the header information added to the divided data. Then, the procedure shifts to step S42.

At step S42, the HMI 100a determines whether all the divided data forming the control data corresponding to the tag information are acquired. Specifically, the HMI 100a determines whether the control data is formed of a plurality of divided data copied to the internal memory 105 in order of index number by repetition of step S41 (to be described later).

When it is determined that all the divided data are acquired at step S42, the procedure ends. On the other hand, when it is determined that not all the divided data are acquired, that is to say, there still remains the divided data which is not acquired at step S42, the procedure shifts to step S43.

At step S43, the HMI 100a determines whether the header information and the footer information added to the divided data stored in the common memory 104 are updated. Specifically, the HMI 100a determines whether both the sequence number included in the header information added to the divided data and the sequence number included in the footer information are updated.

The process at step S43 is repeated until it is determined that both the header information and footer information are updated. When it is determined that both the header information and footer information are updated at step S43, the procedure returns to step S41.

Next, one example of the specific content of the process (process at step S16a in FIG. 7) executed when the controller 200a according to the second embodiment copies the divided data in the internal memory 205 to the common memory 204 is described with reference to FIG. 12.

As illustrated in FIG. 12, the controller 200a (storage processor 206a) first divides the control data stored in the internal memory 205 according to a size of a predetermined area (block assigned for the controller 200a) in the common memory 204, thereby generating the divided data at step S51. Then, the procedure shifts to step S52.

At step S52, the controller 200a copies the divided data generated at step S51 to a predetermined area in the common memory 204 with the header information and the footer information added. Meanwhile, initial values of the index number and the sequence number included in each of the header information and the footer information are one. Then, the procedure shifts to step S53.

At step S53, the controller 200a determines whether all the divided data configuring the control data corresponding to the tag information are copied to the common memory 204. Specifically, the controller 200a determines whether all of a plurality of divided data forming the control data are copied to the common memory 204 one by one in order of index number by repetition of a process at step S55 (to be described later).

When it is determined that all the divided data are copied to the common memory 204 at step S53, the procedure ends. On the other hand, when it is determined that not all the divided data are copied to the common memory 204, that is to say, there still remains the divided data which is not copied to the common memory 204 at step S53, the procedure shifts to step S54.

At step S54, the controller 200a determines whether a predetermined time elapses after the divided data is previously copied to the common memory 204. Meanwhile, a predetermined time is set to be not shorter than three times the cycle of the transmission/reception of the common data (data in the common memory 204) by the cyclic transmission.

The process at step S54 is repeated until it is determined that a predetermined time elapses from when the divided data is previously copied to the common memory 204. When it is determined that a predetermined time elapses after the divided data is previously copied to the common memory 204 at step S54, the procedure shifts to step S55.

At step S55, the controller 200a copies the divided data following the divided data previously copied to the common memory 204 to the common memory 204 with new header information and footer information added (the index number and the sequence number are incremented by one). Specifically, the controller 200a copies the divided data with the index number larger than the previous index number by one to the common memory 204 with the header information and the footer information in which the index number and the sequence number are larger than the previous numbers by one added. Then, the procedure returns to step S53.

As described above, in the second embodiment, the storage processor 206a of the controller 200a is configured to add the footer information corresponding to the header information to the footer of each divided data in addition to adding the header information to the header of each divided data. The storage processor 206a is configured to sequentially copy each divided data to which both the header information and footer information are added to the common memory 204 at a predetermined time interval. According to this, the information added to each divided data are two types of the header information and footer information, so that it is possible more certainly identify each divided data based on the two types of information.

In the second embodiment, as described above, the acquisition processor 107a of the HMI 100a is configured to acquire each divided data from the common memory 104 each time the sequence numbers of both the header information and footer information added to each divided data in the common memory 104 are updated, and to sequentially copy acquired each divided data to the internal memory 105. According to this, the HMI 100a may certainly determine whether new divided data is stored in the common memory 104 by monitoring whether the sequence numbers of both the header information and footer information are updated. That is to say, even when the cyclic transmission is performed at a timing at which only the header information is updated before the new divided data is stored in the common memory 204 of the controller 200a, the HMI 100a may certainly determine whether the new divided data is stored in the common memory 104 by confirming whether the footer information added to the divided data in the common memory 104 is updated as the header information.

Meanwhile, other effects of the second embodiment are similar to those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A monitoring control system comprising:
a controller that controls external equipment; and
a monitoring control device that monitors and controls the controller through a network, wherein
each of the controller and the monitoring control device is configured to cyclically perform cyclic transmission in the network,
the monitoring control device comprises:
a first common memory to store therein common data cyclically transmitted/received by the cyclic transmission;
a first internal memory; and
a search processor that searches control data to control the controller by transmitting tag information associated with the control data to the controller, and the controller comprises:
a second common memory to store therein the common data;
a second internal memory; and
a storage processor that stores the control data read from the second internal memory, in the second common memory as the common data, to be cyclically transmitted to the monitoring control device and stored in the first common memory, when the control data corresponding to the tag information received from the monitoring control device is not stored in the second common memory.

2. The monitoring control system according to claim 1, wherein the storage processor is configured:
to divide the control data into a plurality of divided data having a size not larger than a predetermined value when a size of the control data is larger than the predetermined value;
to add different pieces of header information to a header of each of the plurality of divided data; and
to sequentially store each of the divided data to which the header information is added one by one in the second common memory at a predetermined time interval to be cyclically transmitted to the monitoring control device to be stored in the first common memory.

3. The monitoring control system according to claim 2, wherein the header information comprises index information indicating a part of the control data to which each of the divided data corresponds.

4. The monitoring control system according to claim 2, wherein the header information comprises sequence information that sequentially changes each time each of the divided data is stored in the second common memory.

5. The monitoring control system according to claim 2, wherein the monitoring control device further comprises an acquisition processor that acquires each of the divided data, sent from the controller, from the first common memory each time the header information of each of the divided data stored in the first common memory as the common data changes, and that sequentially stores each of the acquired divided data in the first internal memory.

6. The monitoring control system according to claim 2, wherein the storage processor is configured:
to add footer information corresponding to the header information to a footer of each of the divided data; and
to sequentially store each of the divided data to which both the header information and footer information are added in the second common memory at the predetermined time interval.

7. The monitoring control system according to claim 6, wherein the monitoring control device further comprises an acquisition processor that acquires each of the divided data from the first common memory each time both the header information and the footer information of each of the divided data stored in the first common memory as the common data change, and that sequentially stores each of the acquired divided data in the first internal memory.

8. The monitoring control system according to claim 2, wherein the predetermined time interval is set to be not shorter than three times a cycle of transmission/reception of the common data by the cyclic transmission.

9. A monitoring control device configured to monitor and control a controller which controls external equipment through a network and to cyclically perform cyclic transmission in the network, the monitoring control device comprising:
a first common memory to store therein common data cyclically transmitted/received by the cyclic transmission;
a first internal memory;
a search processor that searches control data to control the controller by transmitting tag information associated with the control data to the controller; and
an acquisition processor that acquires the control data from the controller, the control data being divided into a plurality of divided data cyclically received from the controller and stored in the first common memory as the common data, the acquisition processor acquiring each of the divided data from the first common memory each time header information of each of the divided data stored in the first common memory changes, and sequentially storing each of the acquired divided data in the first internal memory.

10. A controller configured to control external equipment and to cyclically perform cyclic transmission in a network, the controller comprising:
a second common memory to store therein common data cyclically transmitted/received by the cyclic transmission;
a second internal memory; and
a storage processor that stores control data read from the second internal memory in the second common memory as the common data when the control data corresponding to tag information received from a monitoring control device that monitors and controls the controller through the network is not stored in the second common memory,
wherein the storage processor is configured:
to divide the control data into a plurality of divided data having a size not larger than a predetermined value when a size of the control data is larger than the predetermined value;
to add different pieces of header information to a header of each of the plurality of divided data; and
to sequentially store each of the divided data to which the header information is added one by one in the second common memory at a predetermined time interval to be cyclically transmitted to the monitoring control device to be stored in a first common memory.

* * * * *